(No Model.)

S. J. SIMS.
PEN EJECTOR.

No. 583,239.  Patented May 25, 1897.

WITNESSES
F. B. Berry.
J. H. Tappan

INVENTOR,
Steen J. Sims.
by John Wedderburn
Attorney

UNITED STATES PATENT OFFICE.

STEEN J. SIMS, OF THAYER, KANSAS.

PEN-EJECTOR.

SPECIFICATION forming part of Letters Patent No. 583,239, dated May 25, 1897.

Application filed August 31, 1896. Serial No. 604,377. (No model.)

*To all whom it may concern:*

Be it known that I, STEEN J. SIMS, a citizen of the United States, residing at Thayer, in the county of Neosho and State of Kansas, have invented certain new and useful Improvements in Pen-Ejectors; and I do hereby declare the following to be a full, clear, and exact description of the invention, such as will enable others skilled in the art to which it appertains to make and use the same.

My invention relates to improvements in penholders, the object of the same being to provide a simple and convenient device in connection with penholders whereby the pen-point may be readily inserted in place, held securely, and conveniently released or ejected whenever it is desired to remove the same.

The invention consists of a penholder having a cylindrical portion upon its upper end and an eccentrically-mounted ejector having a circular outer face which is provided with a series of teeth or projections adapted to engage the inner surface of the pen-point, a shoulder on which said pen-point is adapted to bear when the same is inserted into the holder, and a handle upon the outer end of said ejector, whereby the same may be rotated for the purpose of drawing the pen from the holder.

The invention is clearly illustrated in the accompanying drawings, in which—

Figure 1:
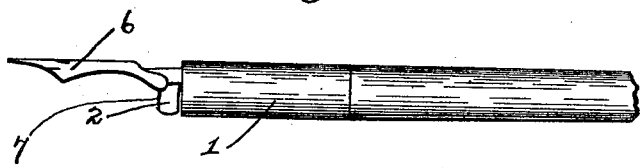
Figure 2:
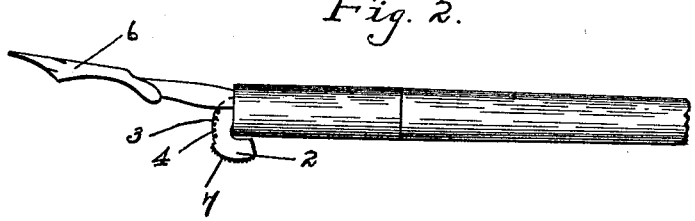
Figure 3:
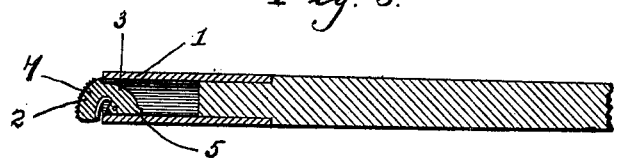
Figure 4:
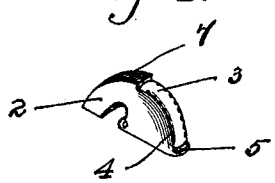

Figure 1 represents a side elevation of my improved penholder with the pen-point shown in place therein. Fig. 2 is a similar view of the same, showing the pen-point in the position it assumes just before it is inserted. Fig. 3 is a vertical sectional view through the same, and Fig. 4 is a detail perspective view of the ejector detached.

Like reference-numerals indicate like parts in the different views.

My improved penholder is formed with a cylindrical or tubular portion 1, which is adapted to fit over an ordinary stick or handle, and in the fore end thereof is eccentrically pivoted an ejector 2, the same being formed with a circular outer edge 3, having a series of teeth or projections 4 thereon. It has a shoulder 5 formed near its rear outer face, against which the pen-point 6 is adapted to bear when the latter is being inserted in place for the purpose of starting the rotation of the ejector 2. The forward end of the ejector 2 has a handle or finger-piece 7 thereon, provided with a milled outer surface, by means of which the ejector may be turned for the purpose of removing the pen without danger of the fingers slipping therefrom.

When the pen-point 6 has been inserted into the tubular portion 1 of the penholder, the inner surface thereof is engaged by the teeth or projections 4 upon the outer curved surface of the ejector. The pen is shown thus engaged in Fig. 1. When it is desired to remove the same, it is merely necessary to place the finger against the milled end or handle 7 of the ejector and turn the latter on its pivotal point, when by reason of the engagement of the teeth 4 with the inner surface of the pen-point 6 the said pen-point will be drawn outwardly.

To insert a pen in the holder, the ejector 2 is drawn to its outer position and the pen-point 6 inserted within the tubular portion 1, bearing against the shoulder 5 on said ejector. As the pen-point is forced inwardly the ejector 2 is rotated, bringing the teeth or projections 4 in engagement with the point 6 and holding it securely.

Having now described my invention, what I claim as new, and desire to secure by Letters Patent, is—

A penholder having a tubular portion, in combination with a pen-ejector, pivoted in the forward end of said tubular portion, formed with a circular outer surface, and provided with teeth or projections along said outer surface, a milled outer end or handle upon said ejector whereby the same may be turned on its pivotal point, and a shoulder adapted to be engaged by the end of the pen-point as the latter is being inserted, substantially as, and for the purpose described.

In testimony whereof I have signed this specification in the presence of two subscribing witnesses.

STEEN J. SIMS.

Witnesses:
G. L. COFFMAN,
L. A. PALMER.